(No Model.)
T. G. TURNER.
HOSE CLAMPING DEVICE.
No. 371,231.                    Patented Oct. 11, 1887.
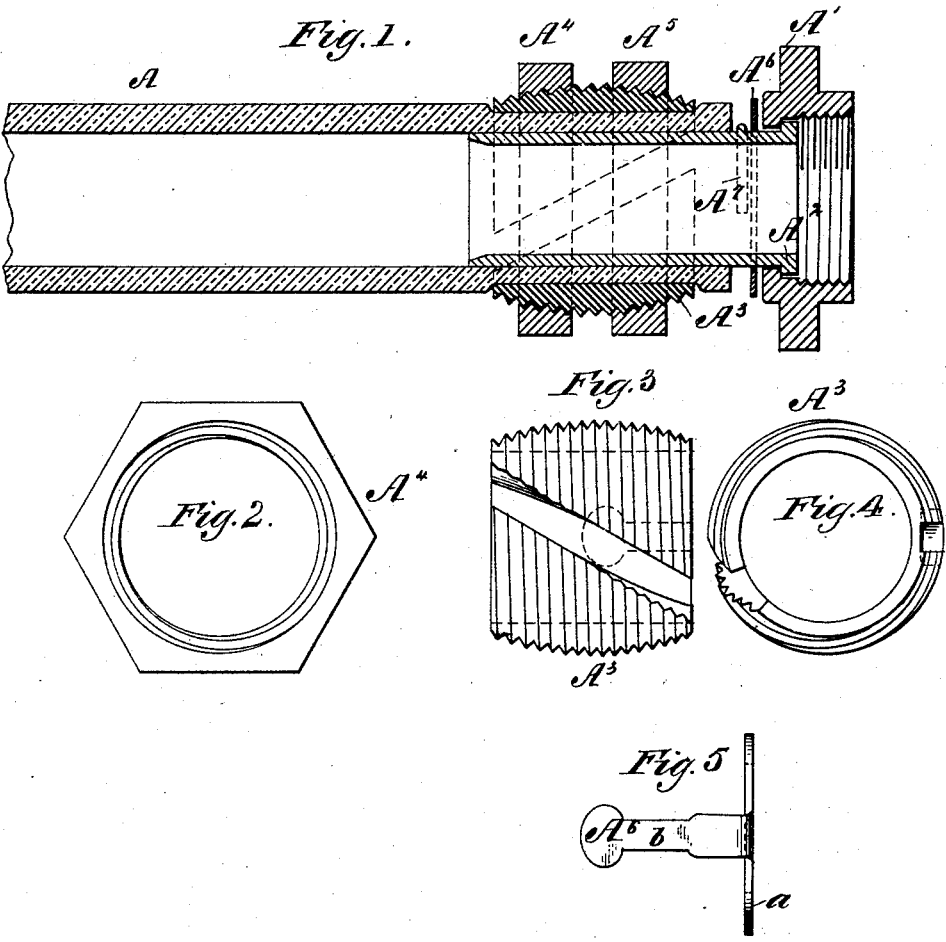
WITNESSES:
INVENTOR
Thos. G. Turner
BY
J. M. Blanchard
ATTORNEY

UNITED STATES PATENT OFFICE.

THOMAS GILPIN TURNER, OF NEW YORK, N. Y.

HOSE-CLAMPING DEVICE.

SPECIFICATION forming part of Letters Patent No. 371,231, dated October 11, 1887.

Application filed January 15, 1887. Serial No. 224,386. (No model.)

*To all whom it may concern:*

Be it known that I, THOMAS GILPIN TURNER, a citizen of the United States, and a resident of New York, in the county of New York and State of New York, have invented certain new and useful Improvements in Hose-Clamping Devices, of which the following is a specification.

My invention relates to improvements in hose-couplings; and the objects of my improvements are, first, to anchor the rubber or other elastic portion of the hose to the metal couplings in such a manner as to preclude the possibility of the parts being separated by any pressure ordinarily applied to them; second, to provide means whereby the elastic and metallic portions can be easily and quickly reunited in the event of the parting of the elastic portion, and, third, to so arrange the parts composing the anchor that an angular strain is put upon them when under pressure, as a consequence of which such strain is made to increase the clamping action of the parts by causing the elastic portion of the hose to adhere more firmly to the metal portion. I attain these objects by the mechanism illustrated in the accompanying drawings, in which—

Figure 1 is a longitudinal sectional elevation showing a portion of a hose made of rubber or other elastic material, a metallic tube to which the elastic part is attached by means of a split ring threaded upon its outer surface, which is made to clamp the elastic portion to the metal tube by means of nuts. The washer which constitutes a portion of the anchor is also shown, and the usual coupling-nut for uniting the sections of the hose. Fig. 2 is a side view of one of the nuts. Fig. 3 is an elevation showing the threaded split ring and a portion of the anchor. Fig. 4 is an end view of the threaded ring, and Fig. 5 is a plan view of the anchor.

In hose-couplings designed, as this is, for use in coupling sections of hose for conveying water used in extinguishing fires and for other purposes, and especially for connecting the tenders of locomotives to their pumps, great difficulty has been heretofore experienced on account of the tendency of the elastic portion to become separated from the metallic portion on account of the pressure put upon them when in use. Another difficulty that has been found to exist is, that when the separation above alluded to has taken place or the elastic portion has been torn apart near the metallic portion it is generally found to be necessary to take the hose to the shop to repair it, or its place must be supplied with a new one.

The objects of my present invention are to provide a remedy for these and other defects, in doing which I employ any elastic hose, A, of any required length and diameter, one end of which is provided with a female nut, A', as shown in Fig. 1 of the drawings, while its opposite end is to be provided with a male screw in the usual manner. Inside of the hose A, at one of its ends, there is inserted a metal tube, $A^2$, the outer end of which is provided with a collar, which is embraced by the nut A' in the coupling of sections of the hose.

Outside of the hose A, at the point where the tube $A^2$ is inserted, there is placed a clamping device, preferably a threaded ring, $A^3$, which is cut diagonally across its length, as shown in Fig. 3, its ends being of less diameter than its central portion, in order that when the nuts $A^4$ and $A^5$ are screwed upon it, as shown in Fig. 1, its diameter may be reduced to such an extent as to cause the elastic portion of the hose to be pressed firmly upon the tube $A^2$, the effect of which will be to prevent the two last-named parts from being separated when no great strain is put upon the parts.

It is a well-known fact that when heavy strain is put upon hose, either by its being filled with water or steam under pressure, the tendency to force the elastic portion of a hose off from the tube upon which it is placed is largely increased, and to prevent or render impossible such separation there is provided a collar, $A^6$, the form of which is clearly shown in Figs. 1 and 3, which show that one portion thereof is bent to a right angle to another portion, its outer portion, a, being provided with an aperture through which the tube $A^2$ passes, while its inner portion, b, is of the form shown in Fig. 5, or of any other form that will allow it to be placed in a recess or cavity formed in the ring $A^3$ in such a manner as to prevent it from being drawn or forced out of said cavity by any force that may be applied to the interior of the hose.

The cavity formed in the ring $A^3$ is, by preference, made to extend throughout a portion only of its length, as shown in Fig. 3, where it will be seen that the anchor is formed with an enlargement on its inner end, which has the effect to prevent its being drawn out of the cavity in the ring $A^3$.

In making provision for putting an angularly-acting resistance upon elastic portion of the hose in the event of its slipping slightly upon the tube $A^2$, I solder or otherwise attach thereto a wire or projection, $A^7$, which is located between the outer end of the elastic portion of the hose and that part of the anchor which surrounds the tube $A^2$. This wire or projection extends only partially around said tube, as shown in Fig. 1, and hence it follows that if the tube should commence to move outward in the elastic portion of the hose it would at once come in contact with said anchor at one point only, the effect of which would be to cause the tube $A^2$ to assume a position at an angle to the portion A, and thus afford additional resistance to the further movement of the tube $A^2$.

The above-described arrangement of parts is such that should the elastic portion of the hose be parted, from overpressure or from any other cause, the nuts $A^4$ and $A^5$ can be unscrewed by means of a wrench, which will loosen the split ring to such an extent as to allow of its being slipped to a sound portion of the hose, when the other parts can be applied and the clamping-nuts again screwed up.

Having thus described my invention, what I claim, and desire to secure by Letters Patent, is—

1. In a hose coupling device, the combination of a coupling-tube extending within the elastic hose, a clamp for compressing the elastic hose upon the coupling-tube, and a connection or anchor connecting the coupling-tube and clamp, substantially in the manner and for the purpose specified.

2. In a hose-coupling device, the combination of the elastic hose, a coupling-tube which enters the end of the said hose, a clamp for compressing the said hose upon the coupling-tube, and a flexible connection or anchor embracing the coupling-tube and engaging with the clamp at a single point, whereby, in the event of the coupling-tube starting out of the hose, an angular movement is given to the coupling-tube and the clamp and an increased amount of resistance is offered to the separation of the parts, substantially as set forth.

3. In a hose-coupling device, a hose-coupling tube extending into the hose and having an attachment or extension whereby it is connected to the clamping device used for compressing the hose about the coupling-tube, said attachment or extension being in contact with the clamp at a single point only, so that in the event of any outward movement of the coupling-tube from the hose an angular movement is given to the clamp and coupling-tube by reason of the single connection, as shown and described.

4. In a hose-coupling device, the anchor or stop $A^6$, connecting the coupling-tube $A^2$ and the clamping device $A^3$, $A^4$, and $A^5$ at a single point, for the purpose and in the manner set forth.

Signed at New York, in the county of New York and State of New York, this 12th day of January, A. D. 1887.

THOMAS GILPIN TURNER.

Witnesses:
J. H. HARRIS,
SIMON HESS.